United States Patent
Digel et al.

(10) Patent No.: US 12,546,903 B2
(45) Date of Patent: Feb. 10, 2026

(54) METHOD FOR DETERMINING AT LEAST ONE SYSTEM STATE BY MEANS OF A KALMAN FILTER

(71) Applicant: Robert Bosch GmbH, Stuttgart (DE)

(72) Inventors: Holger Digel, Kusterdingen (DE); Simon Weissenmayer, Flein (DE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 18/547,208

(22) PCT Filed: Jan. 25, 2022

(86) PCT No.: PCT/EP2022/051562
§ 371 (c)(1),
(2) Date: Aug. 21, 2023

(87) PCT Pub. No.: WO2022/179784
PCT Pub. Date: Sep. 1, 2022

(65) Prior Publication Data
US 2024/0134063 A1 Apr. 25, 2024

(30) Foreign Application Priority Data

Feb. 24, 2021 (DE) .................... 10 2021 104 433.2

(51) Int. Cl.
*G01S 19/39* (2010.01)

(52) U.S. Cl.
CPC .......... *G01S 19/393* (2019.08); *G01S 19/396* (2019.08)

(58) Field of Classification Search
CPC .... G01S 19/393; G01S 19/396; G01S 13/931; G01S 15/66; G01S 15/86; G01S 15/931;
(Continued)

(56) References Cited

U.S. PATENT DOCUMENTS

| | | |
|---|---|---|
| 2005/0128138 A1 | 6/2005 | McCabe et al. |
| 2019/0184987 A1 | 6/2019 | Lee et al. |
| 2020/0312156 A1 | 10/2020 | Sakamaki et al. |

FOREIGN PATENT DOCUMENTS

| | | | |
|---|---|---|---|
| CN | 104880707 | * | 9/2015 |
| CN | 104880707 A | | 9/2015 |

(Continued)

OTHER PUBLICATIONS

Machine Translation of CN 104880707 (Year: 2015).*
(Continued)

*Primary Examiner* — Alan D Hutchinson
(74) *Attorney, Agent, or Firm* — Maginot, Moore & Beck LLP

(57) ABSTRACT

A method for determining at least one system state by way of a Kalman filter assembly, wherein at least one measured value measured by at least one sensor of the system is supplied to the Kalman filter assembly is disclosed. The method includes (a) performing a first estimation of the system state by way of a first Kalman filter of the Kalman filter assembly, a first estimation result and at least one associated first item of information about the reliability of the first estimation result being output, (b) performing a second estimation of the system state by way of a second Kalman filter of the Kalman filter assembly, a second estimation result and at least one associated second item of information about the reliability of the second estimation result being output, the second Kalman filter differing from the first Kalman filter in at least one setting parameter, and (c) fusing the first estimation result and the second estimation result to produce an overall estimation result for the system state, and fusing the first item of information about the reliability of the first estimation result and the second item of information about the reliability of the second (Continued)

estimation result to produce an overall item of information about the reliability of the overall estimation result.

9 Claims, 3 Drawing Sheets

(58) Field of Classification Search
CPC ........ G01S 17/66; G01S 17/86; G01S 17/931; G01S 2013/9322; G01S 2013/9323; G01S 2013/9324; G01S 13/86; G01S 13/862; G01S 13/865; G01S 13/66
See application file for complete search history.

(56) References Cited

FOREIGN PATENT DOCUMENTS

| | | |
|---|---|---|
| JP | 2009-31096 A | 2/2009 |
| JP | 2010-169640 A | 8/2010 |

OTHER PUBLICATIONS

International Search Report corresponding to PCT Application No. PCT/EP2022/051562, mailed May 3, 2022 (German and English language document) (5 pages).

\* cited by examiner

METHOD FOR DETERMINING AT LEAST ONE SYSTEM STATE BY MEANS OF A KALMAN FILTER

This application is a 35 U.S.C. § 371 National Stage Application of PCT/EP2022/051562, filed on Jan. 25, 2022, which claims the benefit of priority to Serial No. DE 10 2021 104 433.2, filed on Feb. 24, 2021 in Germany, the disclosures of which are incorporated herein by reference in their entirety.

The disclosure relates to a method for determining at least one system state by way of a Kalman filter, a computer program for performing the method, a machine-readable storage medium on which the computer program is stored, as well as a system for determining the position of a mobile object, such as in particular a vehicle, configured to perform the method. The disclosure can in particular be applied in the context of at least partially automated or autonomous driving.

BACKGROUND

Kalman filters are used to iteratively estimate system states on the basis of observations which are typically prone to error. In this context, Kalman filters have proven to be particularly advantageous in particular for applications in which sensor information from various sensors has to be combined (or fused) with model information in particular. Moreover, since their calculations are advantageously accurate and robust, Kalman filters are often used in embedded systems. In addition, microcontrollers can advantageously perform the calculations of a Kalman filter in an advantageously efficient manner.

The Kalman filter equations can be described in matrix notation as follows:

$$\hat{x}_k = F_k \hat{x}_{k-1} + B_k \vec{u_k} \quad \text{(GL1)}$$

$$P_k = F_k P_{k-1} F_k^T + Q_k \quad \text{(GL2)}$$

$$\underbrace{H_k K'}_{K} = \underbrace{H_k P_k H_k^T}_{\Sigma_0} \left( \underbrace{H_k P_k H_k^T}_{\Sigma_0} + \underbrace{R_k}_{\Sigma_1} \right)^{-1} \quad \text{(GL3)}$$

$$\underbrace{H_k \hat{x}'_k}_{\mu'} = \underbrace{H_k \hat{x}_k}_{\mu_0} + \underbrace{H_k K'}_{K} \left( \underbrace{\vec{z_k}}_{\mu_1} - \underbrace{H_k \hat{x}_k}_{\mu_0} \right) \quad \text{(GL4)}$$

$$\underbrace{H_k P'_k H_k^T}_{\Sigma'} = \underbrace{H_k P_k H_k^T}_{\Sigma_0} - \underbrace{H_k K'}_{K} \underbrace{H_k P_k H_k^T}_{\Sigma_0} \quad \text{(GL5)}$$

The explicit equations comprising the mathematical symbols K, $\Sigma'$, $\Sigma_0$, $\Sigma_1$, $\mu'$, $\mu_0$, and $\mu_1$, can in particular be used if a corresponding measurement variable with the same scaling exists for each model variable and/or, vice versa, a corresponding model variable at the same scaling exists for each measurement variable. If this is not the case, then e.g. Equations GL3 to GL5 with the mathematical symbols H, K', P, R, $\hat{x}$, and z can be used. For a numerical calculation, these equations can be expressed beforehand in explicit form, which can in particular be achieved by dividing H or $H^T$ on both sides of the equation(s).

Equations GL1 and GL2 describe the iterative estimation process of the Kalman filter, and Equations GL3 to GL5 describe the correction or fusion of the iteratively estimated model values with measured values acquired by means of sensors. For a more detailed explanation, reference is made to the description of a typical Kalman filter design in the context of FIG. 1.

Kalman filters are comparatively complex, however, and there are numerous setting options (in particular the system matrix $F_k$, the variance matrix $R_k$ of the measurement noise, and the variance matrix $Q_k$ of the system noise) that have to be selected and/or set for the respective system behavior being described. This complicates the use of the Kalman filter for new applications and/or maintenance of existing applications.

In part, so-called extended Kalman filters are also used to be able to model non-linear dynamic processes and/or so-called adaptive Kalman filters (or ROSE filters) in order to be able to adjust the numerous setting possibilities in particular the matrix values $R_k$ and $Q_k$ for the measurement and system noise automatically during the runtime by means of additional filters. However, a comparatively large amount of effort is needed to design or configure the additional filters, wherein the ROSE filter, given its additional filters, is even more difficult to configure.

Kalman filter implementations, such as the ensemble Kalman filter, are also known. Said ensemble typically uses a matrix of possible state vectors instead of one state vector and its associated covariance matrix, and it uses a matrix of possible measurement vectors instead of one measurement vector and its associated covariance matrix. As with the standard Kalman filter, prediction of the state $\hat{x}_{i,k}$ of an ensemble element is formed using the transition matrix $F_k$. However, in deviation from the latter, a noise vector $w_{i,k}$ is added whose distribution corresponds to a normal distribution according to $\mathcal{N}_n(0, Q_k)$, wherein the same process noise $Q_k$ is selected for all ensemble elements. Likewise, for the formation of a measurement vector $\vec{z}_{i,k}$ of an ensemble element, a noise vector $v_{i,k}$ is added, the distribution of which corresponds to a normal distribution $\mathcal{N}_n(0, R_k)$, wherein the same covariance matrix $R_k$ of the measurement noise is used for all ensemble elements.

SUMMARY

Proposed herein is a method for determining at least one system state by way of a Kalman filter assembly, wherein at least one measured value measured by at least one sensor of the system is supplied to the Kalman filter assembly, said method comprising at least the following steps:
a) performing a first estimation of the system state by means of a first Kalman filter of the Kalman filter assembly, a first estimation result and at least one associated first item of information about the reliability of the first estimation result being output,
b) performing a second system state estimation using a second Kalman filter of the Kalman filter assembly, a second estimation result and at least one associated second item of information about the reliability of the second estimation result being output, the second Kalman filter differing from the first Kalman filter in at least one setting parameter,
c) fusing the first estimation result and the second estimation result to produce an overall estimation result for the system state, and fusing the first item of information about the reliability of the first estimation result and the second item of information about the reliability of the second estimation result to produce an overall item of information about the reliability of the overall estimation result.

The specified sequence of steps a), b) and c) is by way of example and can be performed in the sequence thus specified, e.g., at least once during a normal operating process in order to perform the method. Alternatively or additionally, steps a), b), and c), in particular steps a) and b), can be performed at least partially in parallel or simultaneously. The method can be performed by a control device, e.g. a (micro)controller which can, e.g., be a part of the system also described here.

The method advantageously enables errors or large inaccuracies in model formation and/or configuration and/or deviations from the observed reference situations by distorted measured values to be detected or (automatically) corrected, even if in a given case the assignment of an expected error to a model error and/or a measurement error is not known. The latter is in particular true since, in the Kalman filter assembly, variously adjusted Kalman filters using the measured values, in particular the same measured values, first perform an estimation independently of each other, and these estimation results are then fused to produce an overall estimation result. This advantageously helps to ensure that setting-specific sources of errors, i.e., errors that are based on a Kalman filter setting, can be compensated for as much as possible, in particular by at least one additional Kalman filter of the assembly with a different setting.

The system can, e.g., be a system for determining the position of an object, e.g., a (motor) vehicle. The system can be arranged at least partially in or on the object, e.g. the vehicle. The vehicle can advantageously be configured for at least partially automated and/or autonomous driving operation, e.g., by means of an appropriately configured control device. The control device can be connected to the system in order to receive position data from the system. The system can comprise multiple sensors, in particular various sensors or various types of sensors, or it can be connected to sensors of the vehicle. The sensors can, e.g., comprise at least one GNSS sensor and an (optical or acoustic) environmental sensor, e.g., a camera sensor, LIDAR sensor, RADAR sensor, ultrasonic sensor, or the like. The measured values from the sensors can be fused by means of the method described here or by means of the Kalman filter assembly.

The method contributes in particular to the (continuous) determination of system states by means of an assembly of Kalman filters and depending on sensor data. The Kalman filter assembly can be provided with measured values from multiple different sensors or different types of sensors of the system in order to perform an estimation by taking these measured values into account. The at least one system state can, e.g., include the (current) (ego) position of a mobile object or mobile unit, in particular one that can be moved along the earth's surface, e.g., a (motor) vehicle (car), a ship, an aircraft, a smartphone or a smartwatch. The at least one system state can further include a (current) speed, a (current) direction of movement, and/or a (current) acceleration of the object. Use of the method described is generally advantageous for any sensor data fusion tasks, e.g., position determination, object detection, and/or driving dynamics control of a vehicle. In addition, the method described can also be used for modeling transmission characteristics of a sensor, e.g., in order to reduce measurement noise and other disruptive influences on the sensor signal.

The Kalman filter assembly can comprise multiple Kalman filters (each operating autonomously) able to operate independently of each other. The Kalman filters can indeed operate independently, but preferably using the same measured values. In particular, the Kalman filters of the assembly can operate at least in part in parallel with one another, or at the same time as one another. In other words, this can also be described as the Kalman filters being arranged or connected parallel to one another within the assembly.

The equations for the individual Kalman filters of the Kalman filter assembly can be specified in a manner similar to Equations (1) to (5), as described hereinafter. In this context, the index i denotes the number of the respective Kalman filter:

$$\hat{x}_{i,k}=F_k\hat{x}_{i,k-1}+B_{i,k}\vec{u}_k \quad (6)$$

$$P_{i,k}=F_kP_{i,k-1}F_k^T+Q_{i,k} \quad (7)$$

$$K'_i=P_{i,k}H_k^T(H_kP_{i,k}H_k^T+R_{i,k})^{-1} \quad (8)$$

$$\hat{x}'_{i,k}=\hat{x}_{i,k}+K'_i(\vec{z}_k-H_k\hat{x}_{i,k}) \quad (9)$$

$$P'_{i,k}=P_{i,k}-K'_iH_kP_{i,k} \quad (10)$$

In step a), a first estimation of the system state is performed by means of a first Kalman filter (index: i=1) of the Kalman filter assembly, wherein a first estimation result (mathematical symbol: $\hat{x}'_{1,k}$) and at least one associated first item of information (mathematical symbol: $P'_{1,k}$) about the reliability of the first estimation result are output. In step b), a second estimation of the system state is performed by means of a second Kalman filter (index: i=2) of the Kalman filter assembly, wherein a second estimation result (mathematical symbol: $\hat{x}'_{2,k}$) and at least one associated second item of information (mathematical symbol: $P'_{2,k}$) about the reliability of the second estimation result are output. In principle, more than two Kalman filters can be provided or can belong to the Kalman filter assembly. The first estimation and the second estimation are typically performed in the same chronological step (index: k).

The second Kalman filter differs from the first Kalman filter in at least one setting parameter. Accordingly, if more than two Kalman filters are provided, then each further Kalman filter can, e.g., differ from the other Kalman filters in at least one setting parameter. Individual or multiple parameters of the setting options specified hereinabove (in particular the system matrix $F_k$, the variance matrix of the measurement noise $R_k$, and the variance matrix of the system noise $Q_k$) are conceivable as setting parameters. The setting parameters can, e.g., include entries of variance matrices or covariance matrices of the Kalman filters. It is further conceivable that the setting parameters relate to factors regarding the scaling of the corresponding matrices and thus influence the variance matrices or covariance matrices, or they assist in adjusting the relevant Kalman filter.

In particular, in steps a) and b), multiple independent Kalman filters comprising at least the first Kalman filter and the second Kalman filter in parallel, in particular having multiple individual covariance matrices (mathematical symbol: $P_{i,k}$) in the same chronological step, but given different assumptions about possible incorrect sensor and/or model variables, in particular given individual assumptions about process noise (mathematical symbol: $Q_{i,k}$), and/or given individual assumptions about the covariance matrix for the measurement noise (mathematical symbol: $R_{i,k}$) can be calculated. Their independent state vectors (mathematical symbol: $\hat{x}'_{i,k}$) and covariance matrices (mathematical symbol: $P'_{i,k}$) are fused together before output, or in step c).

For example, one or more of the following variables can be (selected as) the same for multiple or all Kalman filters of the Kalman filter assembly:
  i: index of a Kalman filter,
  j: number of Kalman filters,
  $F_k$: transition matrix propagating the system state from time $t_{k-1}$ to time $t_k$, e.g., using motion equations, $H_k$: an observation matrix mapping the n values of the system state onto the m observations, and/or $\vec{z}_k$: new observations provided at time $t_k$.

Preferably, at least one or more of the following variables (of the second Kalman filter) differ from the variables of another Kalman filter (in particular the first Kalman filter):

$\hat{x}_{i,k}$: system state at time $t_k$ derived from the state at the previous time $t_{k-1}$ prior to application of the new observations $\vec{z}_k$, $\hat{x}'_{i,k}$: system state following application of the new observations $\vec{z}_k$ (a posteriori), $P_{i,k}$: covariance matrix of the errors in $\hat{x}_{i,k}$ prior to application of the new observations $\vec{z}_k$ (a priori), $P'_{i,k}$: covariance matrix of the errors in $\hat{x}'_{i,k}$ after application of the new observations $\vec{z}_k$ (a posteriori), $R_{i,k}$: covariance matrix of the measurement noise, and/or $Q_{i,k}$: covariance matrix of the process noise or process noise with which it is possible to make the covariance matrix $P'_{i,k}$ maintain the correct long-term relation to the system state failures $\hat{x}'_{i,k}$.

In step c), a fusing the first estimation result (mathematical symbol: $\hat{x}'_{1,k}$) and the second estimation result (mathematical symbol: $\hat{x}'_{2,k}$) to an overall estimation result (mathematical symbol: $\hat{x}'_{fus,k}$) for the system state as well as the first item of information (mathematical symbol: $P'_{1,k}$) on the reliability of the first estimation result and the second item of information (mathematical symbol: $P'_{2,k}$) on the reliability of the second estimation result to an overall information (mathematical symbol: $P'_{fus,k}$) concerning the reliability of the overall estimation result takes place.

According to one advantageous configuration, it is proposed that the same measured values be supplied to the first Kalman filter and the second Kalman filter. For example, the first Kalman filter and the second Kalman filter can have measured value inputs connected to the same sensor output. In other words, this can also be described as, regarding the first Kalman filter and the second Kalman filter, the (new) observations (measurement vector: $\vec{z}_k$) are equal or the same (in the relevant chronological step).

It is proposed according to a further advantageous configuration that, in step c), the first estimation result is weighted using the first item of information about the reliability of the first estimation result, and the second estimation result is weighted using the second item of information about the reliability of the second estimation result. In particular, the respective estimation results (mathematical symbol: $\hat{x}'_{i,k}$) can be weighted using the associated covariance matrices (mathematical symbol: $P'_{i,k}$).

For example, an average $\hat{x}'_{fus,k}$ of the system state weighted with the covariance matrices $P'_{i,k}$ from all j Kalman filters can be calculated as follows:

$$\hat{x}'_{fus,k} = P'_{fus,k} \sum_{i=1}^{j} P'^{-1}_{i,k} \hat{x}'_{i,k} \quad (11)$$

The fused covariance matrix $P'_{fus,k}$ from all Kalman filters can thereby be calculated as follows:

$$P'_{fus,k} = \left( \sum_{i=1}^{j} P'^{-1}_{i,k} \right)^{-1} \quad (12)$$

According to a further advantageous configuration, it is proposed that the overall item of information (mathematical symbol: $P'_{fus,k}$) about the reliability of the overall estimation result be corrected using a measurement for the discrepancy (mathematical symbol: D) between the first estimation result (mathematical symbol: $\hat{x}'_{1,k}$) and the second estimation result (mathematical symbol: $\hat{x}'_{2,k}$). In the calculation of the measurement for the discrepancy, the overall estimation result (mathematical symbol: $\hat{x}'_{fus,k}$) and/or the respective item of information (mathematical symbol: $P'_{i,k}$) about the reliability of the relevant estimation result can also be taken into account.

For example, the discrepancy D between the different estimation results or the Kalman filter model values $\hat{x}'_{i,k}$ can be calculated as follows:

$$D = P'_{fus,k} \sum_{i=1}^{j} P'^{-1}_{i,k} (\hat{x}'_{i,k} - \hat{x}'_{fus,k})(\hat{x}'_{i,k} - \hat{x}'_{fus,k})^T \quad (13)$$

Accordingly, the discrepancy D can, e.g., be calculated based on the covariance matrices $P'_{i,k}$ using the previous variance calculation $P'_{fus,k}$, the weighted sum based on the system states $\hat{x}'_{i,k}$ of the Kalman filters, and the weighted average $\hat{x}'_{fus,k}$ of the system state based on the covariance matrices $P'_{i,k}$ of the Kalman filters.

The measurement for the discrepancy can (subsequently) further be weighted using a weight $E_D$ for the discrepancy and/or optionally added to the weight $E_P$ of the covariance for the weighted and fused covariance matrix $P'_{fus,k}$, e.g. as follows:

$$P'_{out,k} = E_P P'_{fus,k} + E_D D \quad (14)$$

For example, the weight $E_D$ for the discrepancy or the weight $E_P$ for the covariance in the form of matrices can also be multiplied element-wise or be a scalar variable. In this case, $P'_{out,k}$ describes the output for the overall item of information about the reliability of the overall estimation result from the Kalman filter assembly.

In particular, the measurement for the discrepancy can be determined or calculated using the following elements (see Equation 13):

the first estimation result,
the second estimation result,
the overall estimation result,
the item of information about the reliability of the first estimation result,
the item of information about the reliability of the second estimation result, and
the overall item of information about the reliability of the overall estimation result.

It can further be provided that the discrepancy or the measurement for the discrepancy be temporally filtered and/or scaled element-wise.

Alternatively or in addition to the calculations according to Equations (11) to (14), the weighted average $\hat{x}'_{fus,k}$ of the system state can be calculated with weights $\pi_i$, e.g. as follows:

$$\hat{x}'_{fus,k} = \sum_{i=1}^{j} \pi_i \hat{x}'_{i,k} \quad (15)$$

In this context, the covariance matrix output $P'_{fus,k}$ or $P'_{out,k}$ can be calculated as follows:

$$P'_{out,k} = \left(\sum_{i=1}^{j} \pi_i \left(P'_{i,k} + \hat{x}'_{i,k} \hat{x}'^T_{i,k}\right)\right) - \hat{x}'_{fus,k} \hat{x}'^T_{fus,k} \qquad (16)$$

In contrast to Equations (11) to (14), the error detection and compensation cannot be quite as pronounced (the deviations from errors can lead to somewhat smaller or small variances). However, Equations (15) and (16) have the advantage that no inverse matrices need be calculated, so computational time can be advantageously saved.

The weights $\pi_i$ can be statically selected or dynamically calculated, wherein, for the dynamic calculation of the weights $\pi_i$, the covariance matrices $P'_{i,k}$, the fused system state, $\hat{x}'_{fus,k}$ and the system states $\hat{x}'_{i,k}$ can be used, and wherein the sum of all weights $\pi_i$ at any given time is 1.

In particular, it can be provided that (see Equations 15 and 16):
- the overall estimation result is calculated using the estimation results from the first and second Kalman filters and with weights, and
- the overall item of information about the reliability of the overall estimation result is calculated using the weighted estimation results from the first and second Kalman filters, the (weighted) item of information about the reliability of the estimation results of the first and second Kalman filters, and the (unweighted) estimation results from the first and second Kalman filters and the weights.

According to a further advantageous configuration, it is proposed that the second Kalman filter differs from the first Kalman filter in at least one setting parameter of the covariance matrix for the measurement noise (mathematical symbol: $R_{i,k}$). The setting parameter can, e.g., be an entry in the covariance matrix for the measurement noise or a factor used for scaling the covariance matrix for the measurement noise. The setting parameter is particularly chosen such that the covariance matrix for the measurement noise from the first Kalman filter is different from the covariance matrix for the measurement noise from the second Kalman filter (in the same chronological step).

According to a further advantageous configuration, it is proposed that the second Kalman filter differ from the first Kalman filter in at least one setting parameter of the covariance matrix for the process noise (mathematical symbol: $Q_{i,k}$). The setting parameter can, e.g., be an entry of the covariance matrix of the process noise or a factor used for scaling the covariance matrix of the process noise. The setting parameter is in particular chosen such that the covariance matrix of the process noise of the first Kalman filter is different from the covariance matrix of the process noise of the second Kalman filter (in the same chronological step).

In this context, the configuration of the Kalman filters of the Kalman filter assembly can differ primarily in the choice of the covariance matrix $R_{i,k}$ of the measurement noise and/or the process noise $Q_{i,k}$. In particular, for a sensor value whose error cannot in advance be so reliably detected and compensated that its influence on the Kalman filter calculation can be disregarded, a separate Kalman filter with an individual covariance matrix $R_{i,k}$ of the measurement noise can be determined, or added to the arrangement. In this context, for example, a diagonal element entry of the covariance matrix $R_{i,k}$ of the measurement noise (in the Kalman filter provided for this purpose) can be increased by the square of the error value. Furthermore (alternatively), e.g., based on known reference values $\vec{z}_{ref,k}$ and measured values from a situation with the incorrect signal, an individual covariance matrix $R_{i,k}$ of the measurement noise can be calculated over a number of n measurement steps as follows:

$$R_{i,k} = \frac{1}{n} \sum_{k=1}^{n} \left(\vec{z}_k - \vec{z}_{ref,k}\right)\left(\vec{z}_k - \vec{z}_{ref,k}\right)^T \qquad (17)$$

By way of example, for each model value whose errors cannot be reduced strongly enough in advance by means of corresponding modeling, the corresponding diagonal element for the process noise $Q_{i,k}$ can be increased in a similar manner.

For example, if only a potentially erroneous sensor value or only a potentially erroneous model value is to be compensated for, then it can be advantageous or sufficient to design the Kalman filter assembly using, e.g., only two Kalman filters, wherein the configuration of the first Kalman filter is designed with the assumption that no interference is present, and the configuration of the second Kalman filter is designed with the assumption of interference. For example, if erroneous values of more than one sensor value and/or model value are to be detected, then it can be advantageous to implement a Kalman filter for any possible combination of multiple erroneous sensor values in addition to each Kalman filter for each potentially erroneous sensor value.

According to a further advantageous configuration, it is proposed that at least the first item of information about the reliability of the first estimation result or the second item of information about the reliability of the second estimation result be corrected using a discrepancy between at least one model value associated with the relevant estimation and at least one measured value associated with the relevant estimation. Doing so can advantageously help improve the covariance matrix $P'_{i,k}$ calculated by means of the Kalman filters for the calculation of the assembly (e.g., to compensate as much as possible for an incorrect assumption of an existing or non-existent interference).

For example, it is advantageous to correct the covariance matrix $P'_{i,k}$ before calculation of the assembly or the overall item of information about the reliability of the overall estimation result using a Kalman filter individual discrepancy $D_i$. For example, this discrepancy $D_i$ can be calculated as follows:

$$D_i = W_{i,0} + K'_i(W_{i,1} - W_{i,0}) \qquad (18)$$

The substitutions $W_{i,0}$ and $W_{i,1}$ can be calculated as follows:

$$W_{i,0} = H_k \left(\hat{x}_{i,k} - \hat{x}'_{i,k}\right)\left(\hat{x}^T_{i,k} - \hat{x}'^T_{i,k}\right) H_k^T \qquad (19)$$

$$W_{i,1} = \left(\vec{z}_k - H_k \hat{x}'_{i,k}\right)\left(\vec{z}_k - H_k \hat{x}'_{i,k}\right)^T \qquad (20)$$

Regarding calculation of the arrangement using Equations (11) to (13) or the overall item of information about the reliability of the overall estimation result, instead of the covariance matrix $P'_{i,k}$ in this case it is possible to use the corrected covariance matrix $P''_{i,k}$, which can be calculated using the Kalman filter individual discrepancies $D_i$ as follows:

$$P''_{i,k} = P'_{i,k} + E_i H_k^T D_i H_k \qquad (21)$$

For example, the weighting matrix $E_i$ can be multiplied element-wise by the discrepancy.

In addition, it is also advantageous to filter the discrepancy element-wise PT1, whereby the covariance matrix output $P''_{i,k}$ can advantageously be more stable and robust with respect to the measurement noise.

Proposed according to a further aspect is a computer program for performing a method presented here. In other words, this aspect relates in particular to a computer program (product) comprising instructions which, when the program is executed by a computer, cause the latter to perform a method described herein.

Proposed according to a further aspect is a machine-readable storage medium on which the computer program proposed here is stored or saved. The machine-readable storage medium is typically a computer-readable data carrier.

Proposed according to a further aspect is a system for determining the position of a mobile object, e.g. a vehicle, configured to perform a method described here. The system for determining the position of a mobile object can, e.g., be provided and configured to determine the ego position of a mobile object and/or to measure the position relative to other, in particular moving, mobile objects, e.g. road users. The system can, e.g., comprise a movement and position sensor configured to perform a method described here. The movement and position sensor can, e.g., moreover receive GNSS data and/or environmental sensor data (from environmental sensors of the mobile object or vehicle). In order to perform the method, the system can comprise, e.g., a computing means, e.g., a (micro)controller able to access the computer program described herein. In this context, the storage medium can, e.g., likewise be a part of or connected to the system.

The details, features, and advantageous configurations discussed in connection with the method can accordingly also be performed in the computer program presented herein, and/or the storage medium, and/or the system, and vice versa. In this respect, reference is made to the entirety of the statements made thereby for a more specific characterization of the features.

BRIEF DESCRIPTION OF THE DRAWINGS

The solution presented here and the technical environment thereof are explained in greater detail hereinafter with reference to the drawings. It should be noted that the disclosure is not to be limited by the embodiment examples shown. In particular, unless explicitly stated otherwise, it is also possible to extract partial aspects of the factual subject matter explained in the drawings and to combine them with other components and/or insights based on other drawings and/or the present description. Shown schematically are.

DETAILED DESCRIPTION

Figure 1:
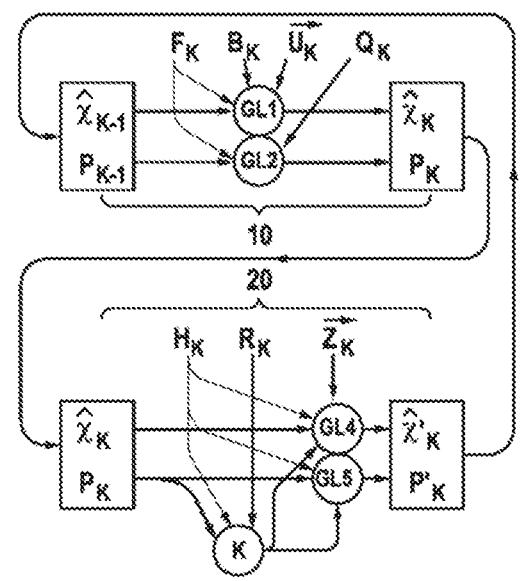
FIG. 1: a typical signal flow diagram of a Kalman filter according to the prior art.

FIG. 1 schematically shows a typical structure of a Kalman filter according to the prior art. The Kalman filter equations on which this structure is based can be described in matrix notation as follows:

$$\hat{x}_k = F_k \hat{x}_{k-1} + B_k \vec{u_k} \quad \text{(GL22)}$$

$$P_k = F_k P_{k-1} F_k^T + Q_k \quad \text{(GL23)}$$

$$\underbrace{H_k K'}_{K} = \underbrace{H_k P_k H_k^T}_{\Sigma_0} \left( \underbrace{H_k P_k H_k^T}_{\Sigma_0} + \underbrace{R_k}_{\Sigma_1} \right)^{-1} \quad \text{(GL24)}$$

$$\underbrace{H_k \hat{x}'_k}_{\mu'} = \underbrace{H_k \hat{x}_k}_{\mu_0} + \underbrace{H_k K'}_{K}\left( \underbrace{\vec{z_k}}_{\mu_1} - \underbrace{H_k \hat{x}_k}_{\mu_0} \right) \quad \text{(GL25)}$$

$$\underbrace{H_k P'_k H_k^T}_{\Sigma'} = \underbrace{H_k P_k H_k^T}_{\Sigma_0} - \underbrace{H_k K'}_{K} \underbrace{H_k P_k H_k^T}_{\Sigma_0} \quad \text{(GL26)}$$

Equation (GL1) describes the estimated state vector $\hat{x}_k$ based on the state vector $\hat{x}_{k-1}$ of the previous chronological step (iterative estimation), the system matrix $F_k$, the control matrix $B_k$, and the control vector $\vec{u}_k$. The state vectors usually describe mean values of Gaussian distributions. In other words, according to Equation (GL1), the new best estimation $\hat{x}_k$ is a prediction made based on the previous best estimation $\hat{x}_{k-1}$ plus a correction for known external influences.

In this context, Equation (GL2) describes the covariance matrix $P_k$ associated with the Gaussian distribution of the estimated state vector $\hat{x}_k$. The latter is obtained based on the covariance matrix $P_{k-1}$ of the previous chronological step (iterative estimation), the system matrix $F_k$, and the covariance matrix of the system noise $Q_k$. In other words, according to Equation (GL2), the new (estimation) uncertainty $P_k$ is predicted based on the old uncertainty $P_{k-1}$ along with an additional uncertainty from the environment.

Equation (GL3) describes what is referred to as the Kalman gain K or the Kalman gain matrix K'. The latter is formed on the basis of the covariance matrix $P_k$, the observation matrix $H_k$, and the covariance matrix of the measurement noise $R_k$. The covariance matrix $P_k$ along with the observation matrix $H_k$ can form the covariance matrix $\Sigma_0$ for the model value vector $\mu_0$.

Equation (GL4) describes the correction of the estimated state vector $\hat{x}_k$ or model value vector $\mu_0$ with measured values represented by the measured value vector $z_k$ or $\mu_1$. Equation (GL4) therefore produces a corrected or fused model value vector $\mu'$ or a new state vector $\hat{x}'_k$, which can be used as the input for a subsequent estimation step.

Equation (GL5) describes the determination of the corrected or fused covariance matrix $P'_k$ or $\Sigma'$ based on the covariance matrix $P_k$ or $\Sigma_0$ the state vector $\hat{x}_k$ or the model value vector $\mu_0$. In this case, the covariance matrix $R_k$ or $\Sigma_1$ the measured value vector $z_k$ or $\mu_1$ is included via the Kalman gain K.

Equations (GL1) and (GL2) therefore describe the iterative estimation process of the Kalman filter. This estimation process is identified in FIG. 1 using reference number 10. Equations (GL3) to (GL5) describe the subsequent correction or fusion of the iteratively estimated model values using measured values acquired by means of sensors. This correction or fusion is identified in FIG. 1 using reference number 20. The corrected or fused (new) model values can be used in a subsequent iteration step of the estimation process 10. This is indicated by the reversed arrow in FIG. 1.

Figure 2:
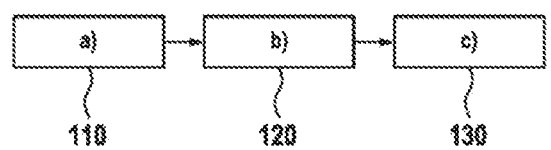
FIG. 2: an exemplary sequence of the method presented herein.

FIG. 2 schematically shows an example of a sequence of the method presented herein. The method is used to determine at least one system state by means of a Kalman filter. At least one measured value measured by at least one sensor of the system is thereby supplied to the Kalman filter assembly. The system can for example be a system for determining the position of a vehicle.

The sequence of steps a), b), and c), as shown by blocks 110, 120 and 130, is by way of example and can, e.g., be gone through at least once in the sequence described in order to perform the method. Steps a), b), and c), in particular steps a) and b), can furthermore also be performed at least partially in parallel or simultaneously.

In block 110, according to step a), a first estimation of the system state is performed by means of a first Kalman filter of the Kalman filter assembly, wherein a first estimation result and at least one associated first item of information about the reliability of the first estimation result are output.

In block 120, according to step b), a second estimation of the system state is performed by means of a second Kalman filter of the Kalman filter assembly, wherein a second estimation result and at least one associated second item of information about the reliability of the second estimation result are output, wherein the second Kalman filter differs from the first Kalman filter by at least one setting parameter.

The first Kalman filter and the second Kalman filter can in this case be provided with the same measured values.

For example, the second Kalman filter can differ by at least one setting parameter of the covariance matrix for the measurement noise from the first Kalman filter.

Alternatively or cumulatively, the second Kalman filter can differ by at least one setting parameter of the covariance matrix of the process noise from the first Kalman filter.

In this context, it can also be provided that the at least one different setting parameter of the second Kalman filter acts on a covariance matrix for the measurement noise of the second Kalman filter and/or on a covariance matrix of the process noise of the second Kalman filter, e.g., by the type of factor used for scaling the relevant matrix.

In block 130, according to step c), fusing the first estimation result and the second estimation result is performed to produce an overall estimation result about the state of the system, as well as fusing the first item of information about the reliability of the first estimation result and the second item of information about the reliability of the second estimation result to produce an overall item of information about the reliability of the overall estimation result.

The first estimation result can in this case be weighted using the first item of information about the reliability of the first estimation result, and the second estimation result can be weighted using the second item of information about the reliability of the second estimation result.

Further, the overall item of information about the reliability of the overall estimation result can be corrected using a measurement for the discrepancy between the first estimation result and the second estimation result.

Furthermore, it can be provided that at least the first item of information about the reliability of the first estimation result, or the second item of information about the reliability of the second estimation result, are corrected using a discrepancy between at least one model value associated with the relevant estimation and at least one measured value associated with the relevant estimation.

Figure 3:
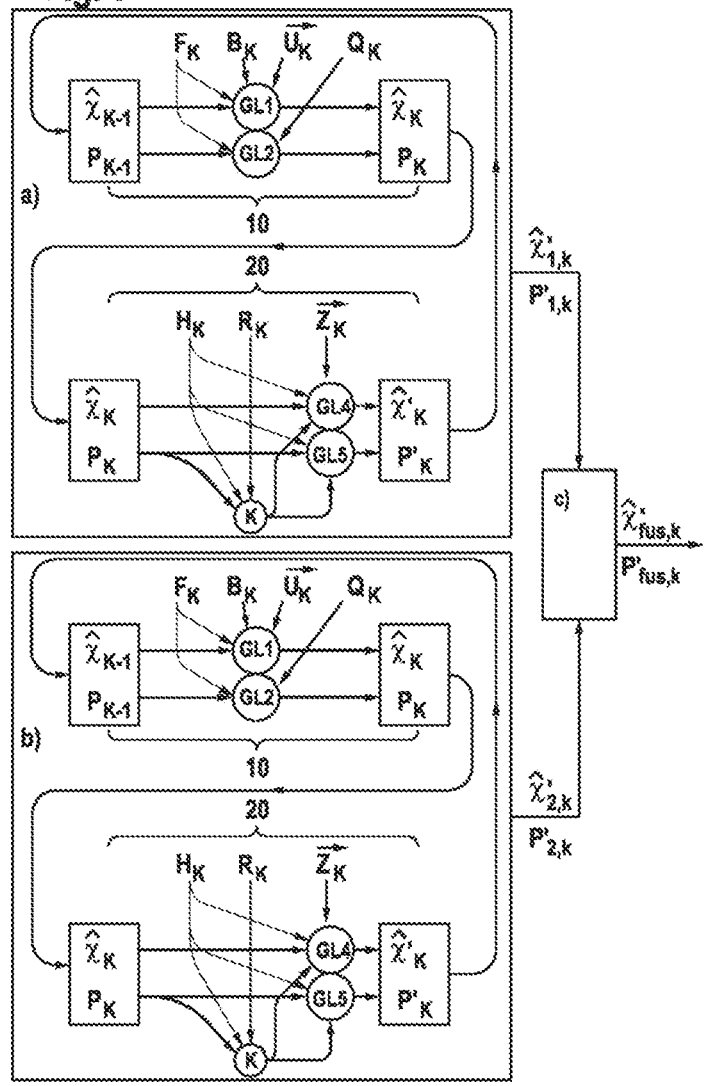
FIG. 3: an exemplary, more detailed illustration of the method presented herein.

FIG. 3 schematically shows an exemplary detailed illustration of the method presented here. In the Kalman filter assembly, a Kalman filter estimation is respectively performed in step a) and step b), with the corresponding outputs: first estimation result $\hat{x}'_{1,k}$ and associated first item of information $P'_{1,k}$ about the reliability of the first estimation result and the second estimation result $\hat{x}'_{2,k}$ and the associated second item of information $P'_{2,k}$ about the reliability of the second estimation result. These are fused in step c) to produce the overall estimation result $\hat{x}'_{fus,k}$ and the associated overall item of information $P'_{fus,k}$ about the reliability of the overall estimation result.

The Kalman filters illustrated in FIG. 3 by way of example can differ from one another in their setting in that they have been set or designed given different assumptions regarding sensor accuracy. In this context, the second Kalman filter can, e.g., differ in at least one setting parameter in the covariance matrix $R_k$ of the measurement noise from the first Kalman filter. In simple terms, in the first Kalman filter it could be assumed that there is no sensor error, and in the second Kalman filter it could be assumed that there is a sensor error.

Figure 4:
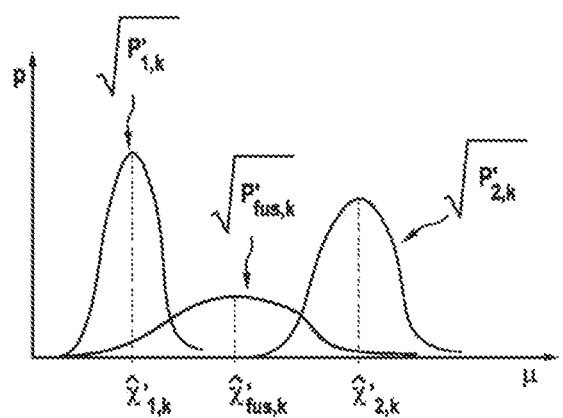
FIG. 4: an illustration of probability density that can be realized with the method presented here.

FIG. 4 schematically shows an illustration of probability density distributions that can be realized with the method presented here. This illustration is based on the exemplary Kalman filter assembly shown in FIG. 3.

Figure 5:
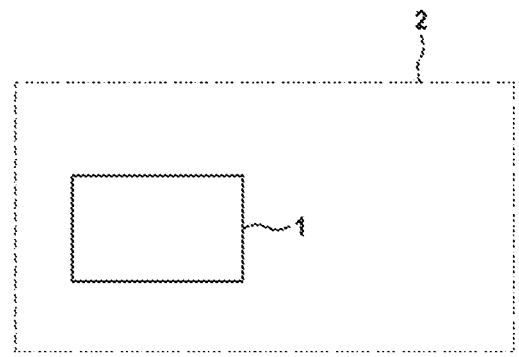
FIG. 5: an exemplary system for determining the position of a vehicle.

FIG. 5 schematically shows an exemplary system 1 for determining the position of a mobile object 2, e.g. a vehicle. The system 1 is provided and configured to perform a method described here.

The method described here and the system described here in particular enable one or more of the following advantages:
- The Kalman filter assembly is advantageously more robust against model and measurement errors.
- Costs can be saved in the development and parameterization of the Kalman filter, in particular in modeling and in the development and parameterization of sensor interference detection and compensation.
- The discrepancy calculation can also be advantageously applied to the outputs from the EKF (extended Kalman filter) and UKF (unscented Kalman filter) Kalman filter extensions, as well as using the known EnKF (ensemble Kalman filter)

The invention claimed is:

1. A method for determining at least one system state of a system by way of a Kalman filter assembly, wherein at least one measured value measured by at least one sensor of the system is supplied to the Kalman filter assembly, the method comprising:
    performing a first estimation of the at least one system state by way of a first Kalman filter of the Kalman filter assembly, a first estimation result and at least one associated first item of information about a reliability of the first estimation result being output,
    performing a second estimation of the at least one system state by way of a second Kalman filter of the Kalman filter assembly, a second estimation result and at least one associated second item of information about the reliability of the second estimation result being output, the second Kalman filter differing from the first Kalman filter in at least one setting parameter,
    fusing the first estimation result and the second estimation result to produce an overall estimation result for the at least one system state, and fusing the at least one associated first item of information about the reliability of the first estimation result and the at least one associated second item of information about the reliability of the second estimation result to produce an overall item of information about the reliability of the overall estimation result, and
    correcting the overall item of information about the reliability of the overall estimation result using a measurement of a discrepancy between the first estimation result and the second estimation result to form a corrected overall item of information about the reliability of the overall estimation result, wherein the at least one sensor and the system are included in a vehicle, and wherein the system uses the overall estimation result for the at least one system state and the corrected overall item of information about the reliability of the overall estimation result to determine an ego position of the vehicle and for at least partially automated or autonomous driving of the vehicle.

2. The method according to claim 1, wherein the first Kalman filter and the second Kalman filter are supplied with the same measured values.

3. The method according to claim 1, wherein the fusing includes:
weighing the first estimation result using the at least one associated first item of information about the reliability of the first estimation result, and
weighing the second estimation result using the at least one associated second item of information about the reliability of the second estimation result.

4. The method according to claim 1, wherein the second Kalman filter differs in at least one setting parameter of a measurement noise covariance matrix from the first Kalman filter.

5. The method according to claim 1, wherein the second Kalman filter differs in at least one setting parameter of a process noise covariance matrix from the first Kalman filter.

6. The method according to claim 1, further comprising correcting at least the at least one associated first item of information about the reliability of the first estimation result or the at least one associated second item of information about the reliability of the second estimation result using a discrepancy between at least one model value associated with a relevant estimation and at least one measured value associated with the relevant estimation.

7. The method according to claim 1, wherein a computer program is configured to perform the method.

8. A non-transitory machine-readable storage medium on which the computer program according to claim 7 is stored.

9. A system for determining a position of a mobile object, the system being configured to perform a method according to claim 1.

* * * * *